United States Patent
Spear

(10) Patent No.: US 8,650,121 B2
(45) Date of Patent: *Feb. 11, 2014

(54) HYBRID CREDIT CARD TRANSACTION SYSTEM

(75) Inventor: Kevin W. Spear, Alpharetta, GA (US)

(73) Assignee: United Parcel Service of America, Inc.

( * ) Notice: Subject to any disclaimer, the term of this patent is extended or adjusted under 35 U.S.C. 154(b) by 513 days.

This patent is subject to a terminal disclaimer.

(21) Appl. No.: 12/771,321

(22) Filed: Apr. 30, 2010

(65) Prior Publication Data

US 2010/0211444 A1    Aug. 19, 2010

Related U.S. Application Data

(63) Continuation of application No. 09/812,452, filed on Mar. 20, 2001, now Pat. No. 7,752,134.

(51) Int. Cl.
*G06Q 40/00* (2012.01)
(52) U.S. Cl.
USPC .................................. 705/41; 705/39
(58) Field of Classification Search
USPC .................................................. 705/35–41
See application file for complete search history.

(56) References Cited

U.S. PATENT DOCUMENTS

| | | | |
|---|---|---|---|
| 4,727,243 A | 2/1988 | Savar | |
| 5,590,038 A | 12/1996 | Pitroda | |
| 5,715,298 A | 2/1998 | Rogers | |
| 5,732,136 A | 3/1998 | Murphree et al. | |
| 5,745,554 A | 4/1998 | Rozetti | |
| 5,883,810 A | 3/1999 | Franklin et al. | |
| 5,903,877 A | 5/1999 | Berkowitz et al. | |
| 6,000,832 A | 12/1999 | Franklin et al. | |
| 6,032,136 A | 2/2000 | Brake, Jr. et al. | |
| 6,065,675 A * | 5/2000 | Teicher | 235/380 |
| 6,088,682 A | 7/2000 | Burke | |
| 6,092,057 A | 7/2000 | Zimmerman et al. | |
| 6,105,863 A | 8/2000 | Jagadish et al. | |
| 6,126,069 A | 10/2000 | Stiefel et al. | |

(Continued)

FOREIGN PATENT DOCUMENTS

| | | |
|---|---|---|
| EP | 1 028 401 | 8/2000 |
| WO | WO 02/23431 A1 | 3/2002 |

OTHER PUBLICATIONS

BPAI decision, Appeal 2008-003918, U.S. Appl. No. 09/812,452, decided on Sep. 30, 2009.*

(Continued)

*Primary Examiner* — Olabode Akintola
(74) *Attorney, Agent, or Firm* — Alston & Bird LLP

(57) ABSTRACT

A hybrid credit card transaction system that processes transactions as either virtual standard transactions directed through a clearinghouse or as virtual closed loop transactions bypassing the clearinghouse, is disclosed. The system includes a logic enabled merchant that detects virtual closed loop transactions and directs them to an affiliated acquiring entity which acquires the virtual closed loop transactions and routes them directly to an affiliated card issuing entity so as to bypass the clearinghouse. The affiliated card issuing entity debits virtual standard transactions to a credit card account and virtual closed loop transactions to a private label account. The logic enabled merchant, associated acquiring entity and the associated card entity may be affiliated by participation in an Internet site that promotes transactions between small businesses and merchants selling wholesale goods. A reduction in processing fees accrued when bypassing the clearinghouse promotes issuance and use of the hybrid credit cards.

13 Claims, 3 Drawing Sheets

(56) References Cited

U.S. PATENT DOCUMENTS

| | | | |
|---|---|---|---|
| 6,131,810 | A | 10/2000 | Weiss et al. |
| 6,138,911 | A | 10/2000 | Fredregill et al. |
| 6,169,974 | B1 | 1/2001 | Baumgartner et al. |
| 6,422,462 | B1 | 7/2002 | Cohen |
| 6,615,189 | B1 | 9/2003 | Phillips et al. |
| 6,615,190 | B1 | 9/2003 | Slater |
| 6,631,849 | B2 | 10/2003 | Blossom |
| 6,636,833 | B1 | 10/2003 | Flitcroft et al. |
| 6,684,197 | B1 | 1/2004 | Kolls |
| 6,915,277 | B1* | 7/2005 | Manchester et al. ............ 705/39 |
| 7,020,633 | B2 | 3/2006 | Strayer et al. |
| 2002/0107731 | A1 | 8/2002 | Teng |
| 2002/0174030 | A1* | 11/2002 | Praisner et al. ................. 705/26 |
| 2003/0009393 | A1 | 1/2003 | Norris |
| 2003/0191714 | A1 | 10/2003 | Norris |

OTHER PUBLICATIONS

Friedman, J. P., Dictionary of Business Terms, Barrons Guides, 2000, p. 597.*

Lee, I., EMTM 553: E-Commerce Systems Lecture Notes, Feb. 16, 2000, 46 pages.*

*Big Brown's Big Coup*; Moving Marketing Streamlining, Moving the Goods Customer Service Management Pro; *Business Week E. Biz*, pp. 76-77, Sep. 18, 2000.

Schneider, G.P., Electronic Commerce, Fourth Ed. 2003, pp. 496-497.

Lee, I, EMTM 553; E-commerce Systems lecture notes, Feb. 16, 2000, 46 pages.

Friedman, J.P., Dictionary of Business Terms, Barrons Guides, 2000, p. 597.

American Express webpage, 2000, 15 pages.

Office Action dated Apr. 14, 2006 of related Chinese Application No. P03US082138.

Office Action dated Oct. 20, 2006 of related Chinese Application No. P03US082138.

Office Action dated Feb. 16, 2007 of related Chinese Application No. P03US082138.

Office Action dated Feb. 13, 2007 of related Canada Application No. 2,441,547.

AmEx-Costco Co-brand: Is It a Marketing or Merchant Acceptance Strategy; Defense Daily, 14,16, NA; Aug. 25, 1999.

Peter Lucas; AmEx Plays Its Cobranded Cards; Credit Card Management, V10, N11, P26(1); Feb. 1998.

Katherine Morrall; Marketing Credit Cards: Offers You Can't Refuse; Bank Marketing, V26, N9, PP37-32; Sep. 1994.

Virtual Express Systems; www.shoppingexpess.net/realtimecreditcards/Pricing; printed Jan. 9, 2001.

American Express—Costco Platinum Cash Rebate Card; www.americanexpress.com/sif/cda/page/0,1641,3368,00.asp; printed Jan. 12, 2001.

Mallpark—The Source for Merchant Business Solutions; www.mallpark.com/MerchSvc00.cfm; printed Jan. 12, 2001.

Office Action U.S. Appl. No. 09/812,452 mailed Jan. 18, 2006.

Final Office Action U.S. Appl. No. 09/812,452 mailed Jun. 19, 2006.

Notice of Allowability Application U.S. Appl. No. 09/812,452 mailed Mar. 19, 2010.

European Search Report for Application No. EP 02723528 dated Jul. 23, 2010.

Office Action dated May 17, 2011 of related Canada Application No. 2,441,547.

* cited by examiner

PRIOR ART

HYBRID CREDIT CARD TRANSACTION SYSTEM

CROSS-REFERENCE TO RELATED APPLICATIONS

The present application is a Continuation of U.S. application Ser. No. 09/812,452, filed Mar. 20, 2001, now U.S. Pat. No. 7,752,134 and titled "Hybrid Credit Card Transaction System," the disclosure of which is incorporated herein by reference in its entirety.

FIELD OF THE INVENTION

The present invention relates to the use of transaction cards to facilitate commercial transactions, more particularly to the use of a hybrid credit card that can be used to conduct revolving credit transactions and private label credit transactions.

BACKGROUND OF THE INVENTION

A large number of firms are in heavy competition to gain market share in the consumer credit market. Consumers of credit cards tend to show little loyalty to any one credit card. This is in part due to an influx of offers from competing credit cards having low initial "teaser" rates and the ease of switching from one card to the next. Credit card sponsors have attempted to inspire loyalty in the cardholders by tying use of the card to a reward system. Some credit card sponsors award points in proportion to the amount of dollar transactions conducted. These points can then be exchanged with the sponsoring airline for free airfare. Another marketing tactic is to tie the total expenditures per year to a cash-back reward that is a small fraction of the total expenditures. Despite the success of some of the incentive programs in obtaining and retaining customers, reward systems are typically costly to implement and can have a detrimental effect on profit margins.

Incentive programs can also be tied to transactions limited to a particular group of transactions where the sponsor is both the acquiring bank and the issuing bank in what is referred to as an "on-us" transaction. In a typical credit card transaction, a cardholder makes a purchase at a merchant and the merchant forwards the transaction to an acquiring bank. The acquiring bank processes the transaction for a fee and sends the transaction through a credit card association network (VISA, MASTERCARD, AMERICAN EXPRESS, etc.). The credit card association network further processes the transaction for a fee and sends the transaction to the card sponsoring bank. The card sponsoring bank then posts the transaction to the cardholder's credit account. In an "on-us" transaction, the acquiring bank and the sponsoring bank are the same entity, which allows the acquiring bank to clear the transaction without forwarding the transaction through the credit card association network and incurring a predetermined fee, or other additional fees. The absence of the credit card association network fee allows the sponsoring bank to more easily support incentives for "on-us" purchases and thereby inspire customer loyalty. Despite the ability to offer incentives for "on-us" transactions, the situations in which an "on-us" transaction can occur are fairly limited. Typically, the merchant must be in a customized agreement with the card sponsor, or must be the card sponsor itself, limiting the number of merchants participating in "on-us" credit transactions.

Merchant exchanges specialize in transactions between merchants where bulk purchases of goods and/or services are made for later resale in retail transactions. Because of the high overall value and low profit margins associated with each transaction, use of credit cards is limited by their relatively high fees. On the other hand, credit must typically be extended by one of the parties to the other to complete the transaction. Evaluating the credit-worthiness of the opposing party is difficult and costly, and tends to limit the access of many small businesses to merchant exchanges.

It would be advantageous to have a credit card that provides sufficient incentives to attract new cardholders and inspire loyalty in current cardholders. It would also be advantageous to have a credit card that facilitates varied transactions with several types of merchants. Another desired feature would be a credit card that can be used by small businesses to purchase from merchants on a merchant exchange without the merchant incurring large fees. Finally, it would be advantageous to have a credit card that increases the number of transactions through incentives while minimizing the detrimental effects on the card sponsor's profits.

SUMMARY OF THE INVENTION

A hybrid credit card transaction system that processes transactions as either virtual standard transactions directed through a clearinghouse or as virtual closed loop transactions bypassing the clearinghouse, is disclosed. Bypassing the clearinghouse reduces the fees associated with standard credit cards and allows the use of an incentive fee structure promoting the issuance and use of the hybrid credit card.

In a first embodiment, the present invention includes a hybrid credit card transaction system for processing a plurality of transactions as either virtual standard transactions routed through a clearinghouse or as virtual closed loop transactions bypassing the clearinghouse. The transaction system includes a hybrid credit card for initiating purchase transactions. The transaction system also includes a logic-enabled merchant having a point of sale terminal including program logic operable to detect the hybrid credit card. The program logic labels each of the transactions as either one of a group of virtual standard transactions or virtual closed loop transactions. An affiliated acquiring entity is configured to acquire and direct the virtual standard transactions to the clearinghouse and to acquire and direct the virtual closed loop transactions so as to bypass the clearinghouse. An affiliated card issuing entity accepts the virtual standard transactions from the clearinghouse and debits a credit card account and accepts the virtual closed loop transactions and debits a private label account.

In another embodiment, the transaction system includes a processing element having an incentive fee structure that returns an incentive fee to the cardholder, the logic-enabled merchant, or both, for conducting virtual closed loop transactions with the hybrid credit card.

In yet another embodiment, the hybrid credit card includes a card identifier having a first string identifying the virtual closed loop transactions and a second string identifying the virtual standard transactions. The first string may include a merchant category code modified to identify the virtual closed loop transactions. The card identifier in either case is detectable by the program logic of the logic-enabled merchant.

In still another embodiment, the present invention includes a product rollout method that is usable by an affiliated card issuing entity for promoting transactions between small businesses and affiliated and non-affiliated merchants. The product rollout method includes providing an internet site for sales by affiliated merchants to the small businesses and registering the small businesses for transactions on the internet site. The affiliated issuing entity offers a private label account and a credit card account to each of the small businesses registered on the internet site. A hybrid credit card is issued having an identification number with a string associated with the private label account and a string associated with the credit card account. Transactions with non-affiliated merchants are cleared to the credit card account for a fee. Transactions with affiliated merchants on the Internet site are cleared to the private label line of credit for a second fee that is lower than the first fee such that transactions on the internet site and adoption of the hybrid credit card are promoted.

The advantage of the present invention for the logic-enabled merchant and hybrid credit cardholder is that the credit card association regulated interchange and card association network fees are avoided, allowing the merchant and cardholder to share the cost savings. The advantage for the affiliated acquiring entity is an increase in the number of transactions and accompanying interchange fees. The advantage for the affiliated card issuing entity is an increase in the number of cardholders and credit balances accruing interest charges.

BRIEF DESCRIPTION OF THE DRAWINGS

Figure 1:
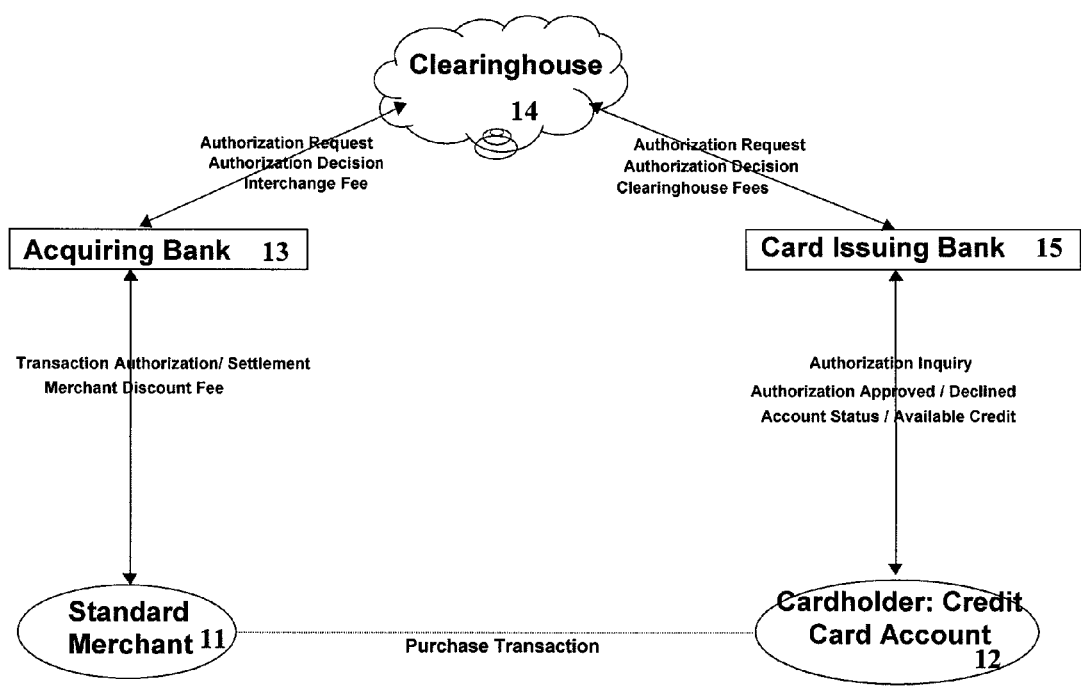
Figure 2:
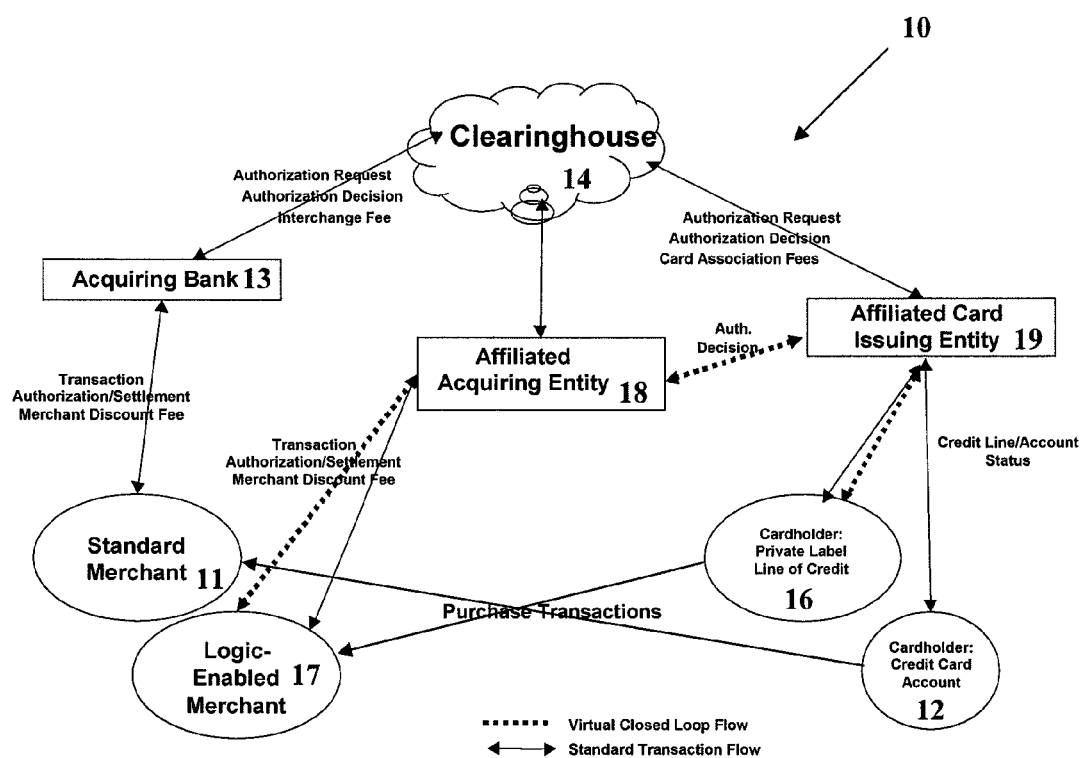
Figure 3:
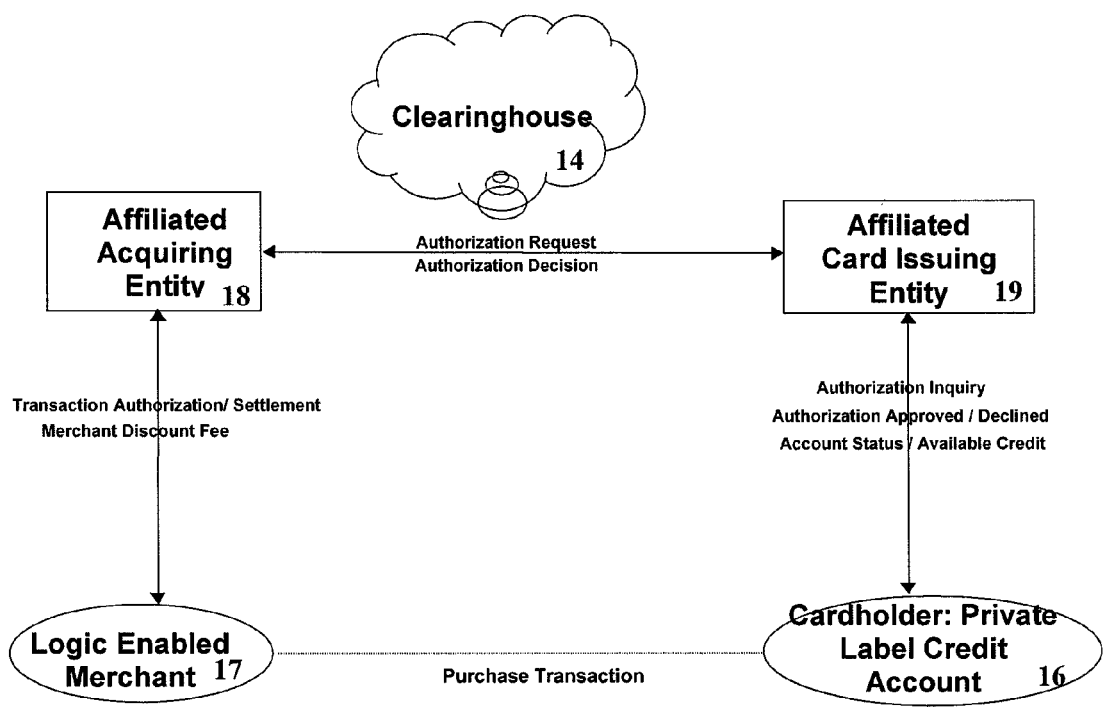

Having thus described the invention in general terms, reference will now be made to the accompanying drawings, which are not necessarily drawn to scale, and wherein:

FIG. 1 is a schematic diagram of a standard credit card transaction processing system of the prior art;

FIG. 2 is a schematic diagram of a hybrid credit card transaction system of the present invention; and FIG. 3 is a schematic diagram of a virtual closed loop transaction which is part of the hybrid credit card transaction system shown in FIG. 2.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The invention relates to a standard credit card transaction system. FIG. 1 is a schematic of a standard credit card transaction of the prior art depicting a purchase transaction occurring between a merchant 11 and a cardholder 12. To make a purchase from the merchant 11, the cardholder 12 presents a credit card to the merchant in return for the receipt of goods and/or services. The merchant 11 either makes an imprint of the credit card or otherwise gathers information on an identification number of the card. The merchant 11 then seeks authorization for the transaction and settlement for the transaction from an acquiring bank 13. The merchant 11 gets authorization from the acquiring bank 13 by communicating the information about the transaction to the acquiring bank including the credit card number and the amount of the transaction. The acquiring entity 13 communicates the credit card number and transaction amount through a clearinghouse 14 for approval and settlement. The acquiring entity 13 receives a merchant discount fee for the services from the standard merchant 11.

The clearinghouse 14 is also known as a credit card association network and can be, for example, MASTERCARD, VISA, or AMERICAN EXPRESS. The clearinghouse 14 communicates the card number and transaction amount to a card issuing bank 15, seeking approval and settlement. The clearinghouse 14 receives financial benefits from the acquiring bank 13 and pays fees to the card issuing bank 15 as compensation for facilitating the transaction. These fee structures are predetermined by the clearinghouse.

The card issuing bank has issued the credit card to the cardholder and a credit card account 12 in conjunction with, or accessed by, the card. The card issuing bank 15 compares the amount of the purchase with a current balance and a credit limit of the credit card account 12 associated with the credit card number communicated from the clearinghouse 14. The card issuing bank 15 approves the transaction if there is sufficient credit remaining or may deny the transaction if the credit limit has been exceeded. If approved, the card issuing bank 15 deducts the transaction amount from the credit card account 12 of the cardholder and via the acquiring bank forwards the amount to an account of the standard merchant 11. The card issuing bank 15 tallies the amount of all transactions for a particular period and submits a statement to the cardholder for payment on the credit card account.

A hybrid credit card transaction system 10 of the present invention includes a hybrid credit card that can be used in either a virtual standard credit card transaction accessing a credit card account or in a virtual closed loop transaction accessing a private label line of credit. FIG. 2 is a schematic of the hybrid credit card transaction system 10 using the hybrid credit card of the current invention. The diagram depicts two alternative types of transactions available when using the system 10, one a virtual standard credit card transaction and the other a virtual closed loop credit card transaction. The term "virtual" herein pertains to the aspect of the invention that mimics the prior art standard and closed loop transactions so as to be transparent to the buyer and the merchant. Transactions using the hybrid credit card can be conducted in situations where the cardholder and hybrid credit card are present during the transactions (face-to-face transactions), in situations where the cardholder and payment card are not present (e.g., telephone order, mail order and internet transactions), and in situations where the cardholder has authorized periodically recurring charges to be posted against their credit card account 12 or private label line of credit 16. Also, the term "hybrid credit card" is used broadly to denote a form of identification of an account or accounts that can even be independent of a physical card.

The virtual standard transaction includes the standard merchant 11, the acquiring bank 13, the clearinghouse 14, an affiliated card issuing entity 19 and the revolving line of credit 12. The virtual closed loop system includes a logic-enabled merchant 17, an affiliated acquiring entity 18, the affiliated card issuing entity 19 and a private label line of credit 16. The affiliated acquiring entity 18, affiliated card issuing entity 19 and the logic-enabled merchant 17 are all affiliated through a prior agreement to reduce fees, offer incentives or somehow cooperate to the advantage of the affiliates or the cardholders to increase the number of cards issued. A discussion of one embodiment of the incentive system follows hereafter in this specification.

Purchases made with the hybrid credit card at a standard merchant 11 invoke the virtual standard transaction process with the acquiring bank 13 acquiring the transaction and the clearinghouse 14 clearing the transaction. However, the affiliated card issuing entity 19 handles the standard transaction as would the card issuing bank 15, modifying the status of the credit card account 12 to debit or credit the transaction. In this manner, the use of the hybrid credit card is extended beyond virtual closed loop transactions. The affiliated card issuing entity 19 benefits from an increase in the number of standard transactions using the hybrid credit cards which might not have been issued if not for the advantages to be had in the virtual closed-loop transactions.

When the hybrid credit card is used at a logic-enabled merchant 17, the logic-enabled merchant transmits the hybrid credit card identification number to the affiliated acquiring entity 18. The affiliated acquiring entity seeks an authorization directly from the affiliated issuing entity 19 and the issuing entity deducts the transaction amount from the private label line of credit. Because of the affiliation agreement and the output of the logic-enabled merchant 17, the clearinghouse 14 is bypassed, along with the interchange and clearinghouse fees, as shown more clearly in FIG. 3. Bypassing these fees allows incentives to be more easily extended to cardholders when using the hybrid credit card for virtual closed loop transactions.

The logic-enabled merchant 17 detects the difference between the standard transaction and the virtual closed loop transaction using the credit card identification number. The hybrid credit card includes a credit card identification number having a first string associated with the private label line of credit 16 and a second string associated with the credit card account 12. The logic-enabled merchant 17 detects the first string using program logic resident within a logic-enabled point of sale terminal. The pairing of the hybrid credit card and the logic-enabled point of sale terminal facilitates the discrete processing of a set of virtual closed loop transactions without interfering with the functionality of the point of sale terminal in its role as a data capture device for standard credit card transactions. The merchant point of sale terminal, as designated herein, is used in an expansive sense and refers to any data capture and transmission device used to process payment card transactions. Point of sale terminals include, but are not limited to, stand-alone terminals, unattended terminals, web sites and personal computers. The term "string" is used herein to indicate any number of letters, objects, symbols, bar codes or numbers or a combination thereof that can be read or submitted to the logic enabled merchant 17.

In another embodiment, the first string is placed in a field that on standard transaction cards is known as a Merchant Category Code (MCC). In standard practice, the MCC is a constant value for all transactions processed through a single merchant terminal. The MCC is typically assigned during the configuration of the merchant terminal and is used to designate a specific merchant in the case of the airlines, auto rental agencies and hotels, or is used to designate a general product category of the product or service being sold, e.g., shoe stores, women's accessory and specialty stores and chiropractors. Computer program logic resident in the logic enabled merchant terminal changes the merchant category code to identify the transaction as a virtual closed loop transaction. The MCC is only changed if the transaction is executed using a hybrid credit card or hybrid credit card account number which is a member of a class of cards or numbers designated for closed loop transaction processing. The use of the MCC to designate a virtual closed loop transaction promotes the unique processing of that transaction by the logic enabled merchant 17, the affiliated acquiring entity 18 and the affiliated card issuing entity 19.

The affiliated acquiring entity 18 acquires the card identification number using it to identify the virtual closed loop transaction and directs the transaction straight to the affiliated card issuing entity 19, bypassing the clearinghouse 14. The affiliated card issuing entity 19 then compares the transaction amount with the available private label line of credit 16 and deducts the amount of the transaction if sufficient credit is available. If sufficient credit is not available, the transaction is denied or treated differently, as determined by previous agreement. The affiliated card issuing entity 19 compiles a billing statement periodically on both the private label line of credit 16 and the revolving line of credit 12 which is sent to the hybrid credit card cardholder.

The advantage of the present invention for the logic-enabled merchant 17 and hybrid credit cardholder is that the interchange and predetermined clearinghouse established fees are avoided, allowing the merchant and cardholder to share the cost savings. In addition, the cardholder benefits from the increased versatility of the hybrid credit card which can be used for multiple transaction types. The advantage for the affiliated acquiring entity 18 is an increase in the number of transactions and accompanying interchange fees. The advantage for the affiliated card issuing entity 19 is an increase in the number of cardholders and credit balances accruing interest charges.

In another embodiment, the present invention includes a product rollout method usable by the affiliated card issuing entity 19 to introduce and promote distribution and acceptance of the hybrid credit card by potential cardholders, in particular small businesses. An internet site is established for sales of bulk goods by a group of affiliated logic-enabled merchants 17 to small businesses. Each of the affiliated merchants uses the same affiliated acquiring entity or entities 18 that are equipped to detect the hybrid card identification code and route virtual closed loop transactions straight to the affiliated card issuing entity 19 for a merchant discount fee. In one aspect, the internet site is a merchant exchange where merchant groups that deal in the same types of goods meet to participate in transactions for those goods. The affiliation is not limited to the members of an internet site but could also include members of different merchant groups that deal in the same type of goods and/or service or have some other common connection. Also, the cardholders on the internet site need not be limited to small businesses but could also be common consumers.

A small business accesses the affiliated internet site through the World Wide Web using an internet browser. In order for the small business to make a purchase from one of the affiliated merchants, the small business must become a registered user. The small business is prompted on the internet site by the affiliated card issuing entity 19 to establish both a private label account and a credit card account associated with the hybrid credit card. The affiliated issuing entity approves or disapproves the small business applicant based on the credit history of the small business. If approved, the affiliated issuing entity issues the hybrid credit card having the identification number with the string associated with the private label account 16 and the string associated with the credit card account 12. The use of private label line of credit can also be referred to as a "diversion account" or a "ghost account" that is used to capture virtual closed loop transactions and effectively segregate them from other standard transactions which may also be executed using the same hybrid credit card.

The affiliated acquiring entity 18 is then free to acquire transactions between the newly registered small business and the logic-enabled merchant 17. Clearing by the affiliated card acquiring entity 19 is performed for transactions on the internet site at a reduced fee that benefits the merchant and the small business by lowering overall costs. The merchant and small business also benefit from an assured line of credit, freeing them from previous concerns about the creditworthiness of the opposite party. The product roll out method benefits the affiliated acquiring entity 18 by providing an incentive for the merchant and small business to conduct transactions on the internet site using the hybrid credit card, increasing the fees earned by the affiliated acquiring entity. The issuing entity 19 benefits from the product roll out method in that the incentives promote the issuance of an increased number of hybrid credit cards which can also be used in standard revolving credit transactions.

Many types of incentives can be used, but the incentives are preferably in the form of a discount on processing fees levied on the logic-enabled merchant 17. The small businesses may also receive a benefit in that the usual fee incurred when using a standard charge card for bulk purchases may be waived or reduced. The incentives can be awarded by any and to any of the parties to the transaction and clearing process. Typically, the party awarding the incentive is the party receiving the benefit of bypassing the clearinghouse 14 and its associated fees.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hybrid credit card transaction system for processing a transaction, initiated by a cardholder using a hybrid credit card, as either one of a group of virtual standard transactions routed through a clearinghouse or as one of a group of virtual closed loop transactions bypassing the clearinghouse, said transaction system comprising:
    a hybrid credit card;
    a merchant having a point-of-sale terminal configured to identify the hybrid credit card and to label the transaction using the hybrid credit card as being one of the virtual closed loop transactions;
    an affiliated acquiring entity configured to acquire and direct the virtual standard transactions to the clearinghouse and configured to acquire and direct the virtual closed loop transactions so as to bypass the clearinghouse; and
    an affiliated card issuing entity configured to accept the virtual standard transactions from the clearinghouse and to debit a credit card account and to accept the virtual closed loop transactions and to debit a private label account;
    wherein the acquiring entity and the card issuing entity participating in the virtual closed loop transaction are separate entities.

2. The hybrid credit card transaction system of claim 1, further comprising a processing element having an incentive fee structure that is configured to return an incentive to the cardholder for conducting virtual closed loop transactions with the hybrid credit card.

3. The hybrid credit card transaction system of claim 2, wherein said incentive is in proportion to a fee avoided when bypassing the clearinghouse.

4. The hybrid credit card transaction system of claim 1, further comprising a processing element having an incentive fee structure that is configured to return an incentive to the merchant for conducting virtual closed loop transactions with the hybrid credit card.

5. The hybrid credit card transaction system of claim 4, wherein said incentive is in proportion to a fee avoided when bypassing the clearinghouse.

6. The hybrid credit card transaction system of claim 1, wherein said hybrid credit card comprises a card identifier having a first string identifying the virtual closed loop transactions and a second string identifying the virtual standard transactions, said card identifier detectable by the point-of-sale terminal.

7. The hybrid credit card transactions system of claim 6, wherein said first string comprises a merchant category code modified to identify the virtual closed loop transactions.

8. The hybrid credit card transaction system of claim 1, wherein the merchant is one of a group of affiliated merchants participating in sales on an internet site.

9. The hybrid credit card transaction system of claim 8, wherein the cardholder is a small business and the internet site is a marketplace for business-to-business transactions.

10. The hybrid credit card transaction system of claim 1, wherein the credit card account comprises a revolving credit line.

11. The hybrid credit card transaction system of claim 1, wherein the private label line of credit is an unsecured credit line that must be periodically paid in full.

12. The hybrid credit card transaction system of claim 1, wherein the affiliated card issuing entity issues separate periodic statements of transaction activity on the private label line of credit and the credit account to the cardholder.

13. The hybrid credit card transaction system of claim 1, wherein the affiliate agreement is further agreed upon by the merchant, said affiliate agreement further defining a fee structure for crediting and debiting fees resulting from the virtual closed loop transaction amongst the merchant, the affiliated acquiring entity and the affiliated card issuing entity.

* * * * *